Nov. 20, 1934.                D. R. DAVIS                1,981,031
                              EMULSIFIER
                         Filed May 8, 1933
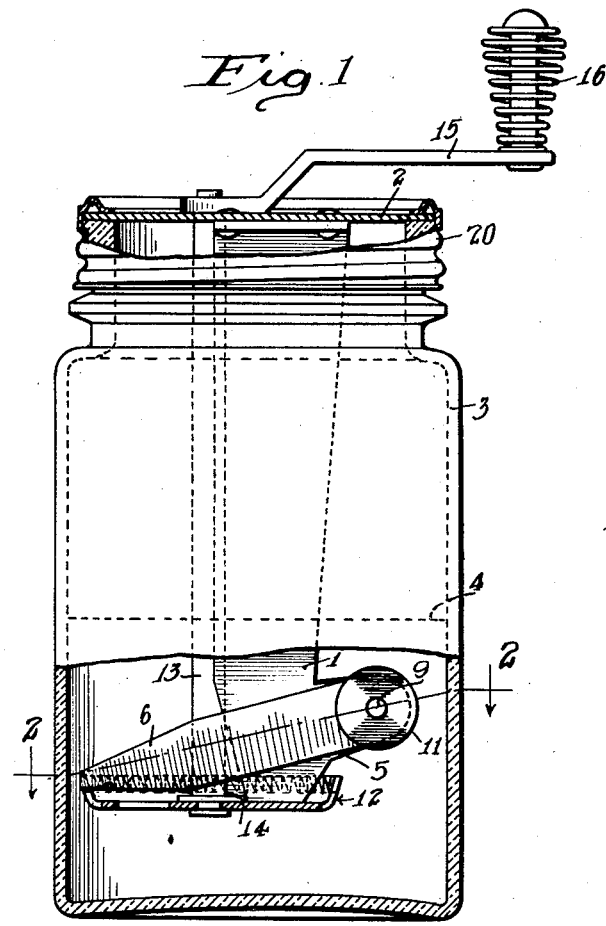
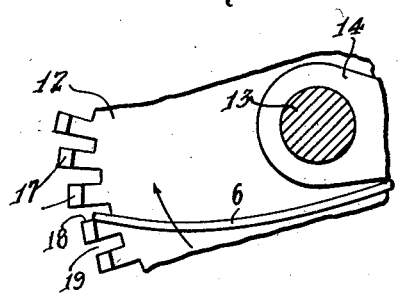
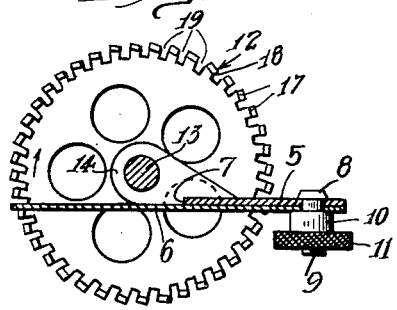
Inventor
David R. Davis
By Lyon+Lyon
Attorneys Patented Nov. 20, 1934

1,981,031

UNITED STATES PATENT OFFICE 1,981,031

EMULSIFIER

David R. Davis, Los Angeles, Calif.

Application May 8, 1933, Serial No. 669,886

11 Claims. (Cl. 259—72)

This invention relates to means for producing an emulsion of a liquid.

The general object of the invention is to provide a simple device, which can be employed in forming emulsions for domestic purposes or other purposes. When used for domestic purposes my invention enables cream to be produced from milk and butter.

In mixing salad dressings according to the usual practice the oil must be poured in slowly and gradually stirred into the mixture. This requires considerable time. My device enables a salad dressing to be prepared in a few moments.

A further object of the invention is to produce a device of this kind, which can be readily applied to a vessel such as a Mason jar, so as to enable liquid in the jar to be emulsified.

Further objects of the invention will appear hereinafter.

The invention consists in the novel parts and combination of parts to be described hereinafter, all of which contribute to produce an efficient emulsifier.

A preferred embodiment of the invention is described in the following specification, while the broad scope of the invention is pointed out in the appended claims.

In the drawing:

Figure 1 is a side elevation and partial section of a jar, in which my emulsifier is mounted for use.

Figure 2 is a section taken about on the line 2—2 of Figure 1, passing through the parts of the emulsifier, and omitting the wall of the jar.

Figure 3 is a detail view upon an enlarged scale, and is a fragmentary plan of a portion of the device, and illustrating the manner in which the emulsifying effect is attained.

Figure 4 is a side elevation of the rotary device, which I prefer to employ in this emulsifier.

Devices have been suggested heretofore for producing emulsions, some of which operate by projecting a small stream of the mixture at a high velocity against a plate, thereby breaking up the molecules of the heavier liquid and effecting the emulsification of the liquids.

According to my invention, I develop a high velocity locally in the mixture and suddenly arrest this velocity. For this purpose I provide a vibrator whose movement is suddenly arrested against a stop. In this way I attain an efficient emulsifying effect.

In practicing my invention, I provide an impact producing means here shown as a vibrator consisting of a resilient member, preferably in the form of a flat spring blade, which is mounted to be submerged in the liquids to be emulsified, and I further provide means, such as a rotary toothed member, for rapidly flexing and quickly releasing the resilient member to produce a succession of rapidly recurring sharp impacts, resembling "hammer blows", in the body of the liquid. I have found in actual practice that the action described has the effect of quickly emulsifying liquids, especially milk and butter, which are rapidly converted into cream when subjected to such action, and at a cost considerably less than the market price of cream.

I am unable to state definitely whether the results obtained are due solely to the rapidly recurring impacts or hammer blows imparted to the liquids by the vibrator or resilient member, or to such impacts when combined with the simultaneous vibrations set up by the resilient member, and/or the circulation of the mixture past the vibrator or impact producing means, such as results from the rotation of the toothed member. Whatever may be the correct explanation for the phenomenon, the fact remains that numerous tests have demonstrated that the implement of my invention, when operated as described, will rapidly emulsify various liquids, and particularly milk and butter which will be quickly converted into excellent cream.

While the elements necessary for accomplishing these effects may be mounted in any suitable manner, and including a vibrator and a part that arrests its movement, in the present drawing, I have illustrated the device as comprising a frame or bracket 1, which is in the form of an elongated plate, the upper end of which is attached to a cover 2, which is adapted to be attached to the mouth of an ordinary Mason jar 3, in which the liquid to be emulsified, is placed. In the drawing, the level of this liquid is indicated by the dotted line 4.

The lower part of the frame 1 is immersed in the liquid, and at this point may be provided with a lateral extension 5, to which the end of a vibrator 6 is secured. The vibrator or impact producing means is preferably in the form of a resilient member, such as a flat spring, which lies flat against the side of the extension 5, but projects beyond the edge 7 of this extension. By mounting the vibrator or resilient member in this way, the outer end thereof extends a considerable distance beyond the edge 7. The vibrator when in the form of a flat spring is preferably removably attached toward the outer end of the extension 5, by means of a pin or bolt 8, which extends through aligning openings in these parts, and which has a threaded shank 9 to receive a nut 10 having a knurled head 11 for rotating it with the fingers, to removably clamp the parts together.

On the frame, I mount means for successively deflecting this vibrator against its resiliency, and then releasing the same to permit it to move through the liquid under the action of its own resiliency. This action produces a succession of rapidly recurring sharp impacts directly in the body of the liquid. This deflection is preferably in the direction of the arrow, (see Fig. 3) which bends the vibrator across the edge 7.

In order to give the vibrator the movement described, I prefer to provide a crown wheel 12, which is immersed in the liquid, and which is supported on a shaft 13 carried in a bearing 14 at the lower end of the frame 1. The upper end of this shaft may be rotatably mounted in the cover 2, and provided with a crank 15 with a handle 16 for rotating the shaft. The crown wheel is preferably formed with circumferentially disposed projections in the form of teeth 17, which are bent upwardly and formed integrally with the body of the wheel, which is substantially of disc form. These teeth are arranged in an annular series and preferably formed on a skew, as indicated, so that their side edges 18 are inclined to a radial line passing through them from the axis of the crown wheel. The teeth are disposed slightly apart, so as to form gaps 19 between adjacent teeth. When the crank 15 is rotated in the proper direction, the crown wheel will rotate in the direction of the arrow indicated in Figure 2. As each tooth passes the plane of the vibrator 6, it engages the end thereof and deflects and flexes it from its normal position, (see Fig. 3). As the rotation of the crown wheel progresses, the tooth engaging the vibrator will release the same allowing it to immediately straighten, whereupon it will move at a high velocity toward the next following tooth, against which it will strike a blow violently displacing a portion of the liquid between the vibrator and the tooth, as the movement of the vibrator is suddenly arrested. This sudden stopping of the movement of the vibrator, also causes a rapid succession of differential pressures on the opposite sides of the spring, and violent impacts of the mixture against the back of the vibrator, which gives a hammering effect which is very efficient in forming the emulsion. The time for producing the emulsion is very short, usually not more than a few minutes.

If desired, the cover 2 may have a threaded flange 20 to enable it to be screwed onto the threaded neck of the jar.

While my emulsifier may be used for making emulsions for any purpose, its use in households offers opportunity to make cream for domestic purposes from milk and butter at a cost that is only a fraction of the cost of cream at the market price.

By having the securing bolt 8 at a distance from the edge 7, the flexing of the vibrator is facilitated without tending to bend its material sharply at the edge 7. This also increases the life of the vibrator.

It is understood that the embodiment of the invention described herein, is only one of the many embodiments this invention may take, and I do not wish to be limited in the practice of the invention, nor in the claims, to the particular embodiment set forth.

What I claim is:—

1. In a device for emulsifying a liquid, the combination of a frame having a part with a hard exterior surface to be immersed in the liquid, a vibrator in the form of a metallic leaf spring supported thereby, and a rotary member supported on said frame and having a series of projections for engaging the spring to deflect the same and operating to cause the vibrator to move rapidly and stop suddenly by striking against the projections thereby delivering hammer blows to the liquid between the impinging surfaces.

2. In a device for emulsifying a liquid, the combination of a frame having a part to be immersed in the liquid, a vibrator in the form of a flat resilient bar supported thereby and having a hard exterior surface in the liquid and a rotary member supported on said frame and having a series of projections for engaging the bar to deflect the same and operating to cause the vibrator to move rapidly to and fro and cause successive rapidly recurring impacts in the liquid.

3. An emulsifier comprising a resilient member adapted to be submerged in the liquids to be emulsified, and means for causing said member to be alternately flexed and straightened in rapid succession to impart a recurring series of sharp impacts to the liquid below the surface thereof.

4. An emulsifier comprising a resilient member mounted to have an end submerged in the liquid to be emulsified, and means acting on said end of said member for alternately flexing and permitting the same to become straightened in rapid succession, whereby the liquid will be subjected to a succession of rapidly recurring impacts.

5. An emulsifier comprising a resilient member mounted to have an end submerged in the liquid to be emulsified, and rotary toothed means acting on said end of said member for alternately flexing and permitting the same to become straightened in rapid succession whereby the liquid will be subjected to a succession of rapidly recurring impacts.

6. An emulsifier, comprising a bracket adapted to be removably mounted upon a vessel with a portion thereof depending into the vessel, a blade spring attached at one end to said bracket, and rotary toothed means acting upon the free end of said spring to alternately flex and release the same, whereby liquid in the vessel will be subjected to a succession of rapidly recurring impacts.

7. An emulsifier, comprising a bracket adapted to be removably mounted upon a vessel with a portion thereof depending into the vessel, a blade spring removably attached at one end to said bracket, and manually operable rotary toothed means acting upon the free end of said spring to alternately flex and release the same, whereby liquid in the vessel will be subjected to a succession of rapidly recurring impacts.

8. An emulsifier comprising a bracket adapted to be mounted upon a vessel with a portion thereof depending therein, a resilient member removably attached to said depending portion of the bracket, and rotary means having an annular series of teeth also carried by the bracket with an end of said resilient member intersecting the path of travel of said teeth, whereby the resilient member may be flexed and released at rapidly recurring intervals, for the purpose specified.

9. An emulsifier, comprising a rotatable member having a circular series of teeth, a blade spring having a free portion positioned to be successively engaged by said teeth, means for rotating said member, and means for removably supporting the same within a vessel.

10. An emulsifying implement adapted to be removably associated with a jar, a cap for the jar, a bracket secured to and depending from the cap, a rotatable shaft having its opposite ends journaled in said cap and bracket respectively, a handle on the upper end of said shaft, a toothed member attached to the lower end of said shaft, and a blade spring attached at one end to said bracket and having its free end positioned to be engaged by the teeth of said toothed member when the latter is rotated.

11. An apparatus for emulsifying liquids, comprising a vessel to contain the liquids to be emulsified, impact-producing means located in the vessel below the level of the liquid therein, said means including two relatively movable members each having a hard impinging surface, and means for causing said surfaces to forcibly contact and separate in rapid succession to produce a succession of rapidly recurring impacts directly upon the liquid between said surfaces and in the body of the liquid below the level thereof.

DAVID R. DAVIS.